Dec. 20, 1966 IWAO UOZUMI 3,292,480
DEVICES FOR PREVENTION OF COTTER PINS FROM
SLIPPING OUT OF POSITION
Filed Dec. 16, 1964 2 Sheets-Sheet 2
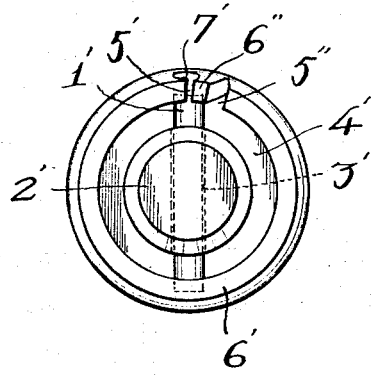
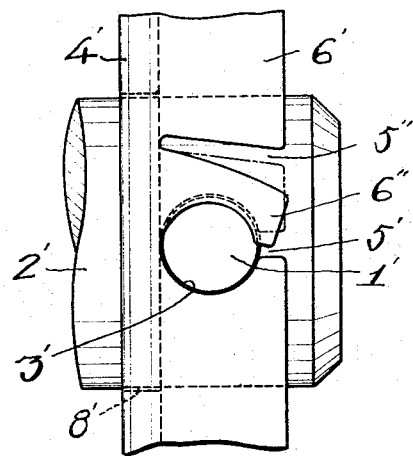
INVENTOR.
IWAO UOZUMI
BY
ATTORNEYS

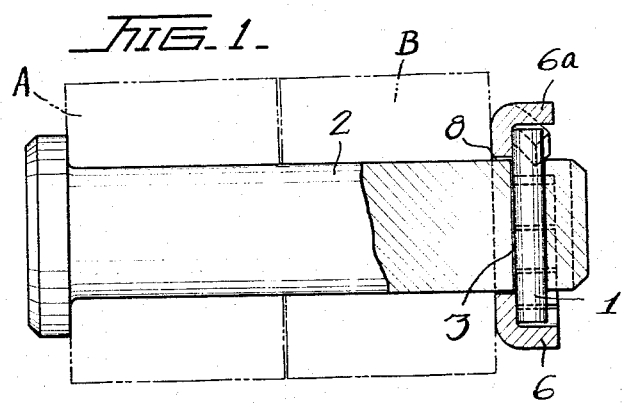
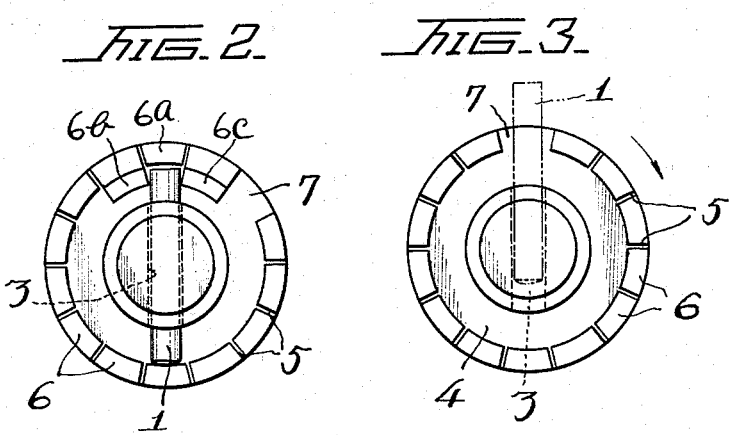
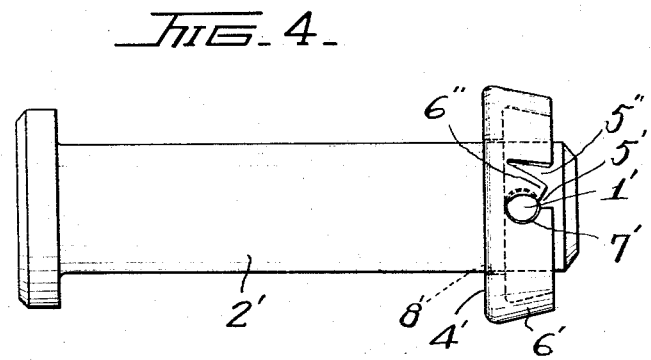

United States Patent Office 3,292,480
Patented Dec. 20, 1966

3,292,480
DEVICES FOR PREVENTION OF COTTER PINS
FROM SLIPPING OUT OF POSITION
Iwao Uozumi, 607 7-chome, Ebara, Shinagawa-ku,
Tokyo, Japan
Filed Dec. 16, 1964, Ser. No. 418,848
Claims priority, application Japan, Apr. 20, 1964,
39/23,021, Patent 12,172
1 Claim. (Cl. 85—8.1)

The present invention relates to a new and improved device for prevention of a cotter pin, which is adapted to secure a wheel or the like to a shaft or a similar rotational member, from slipping out of position in such a manner that the wheel or the like may not inadvertently get free of the shaft or similar rotational member while an operation is being carried out and more particularly to an improved washer adapted to prevent such a cotter pin from slipping out of position.

One major object of the present invention is to provide an improved device which, in a simple manner, can prevent a cotter pin from inadvertently slipping out of position without the necessity for employment of conventional complicated tools.

Another object of the present invention is to provide an improved device which enables a cotter-pin, which is inseparably secured to a shaft or similar rotational member under normal operative conditions, to be removed therefrom in a simple manner when it is desired to remove the cotter pin from the shaft.

Various other objects, features, and advantages of the present invention will be apparent from the following description and from the accompanying drawings illustrating embodiments of the present invention in which:

FIG. 1 is a side elevational view of an assembled unit, partially in cross-section, in which a novel device embodying the present invention is employed and shows said device in cross-section when the same is in its operative position for attaining its intended function;

FIG. 2 is a front elevational view of said device as seen in the position shown in FIG. 1;

FIG. 3 is a front elevational view of said device and which shows the manner in which a cotter pin is inserted into its operative position within said device;

FIGURE 4 is a side elevational view of a device representing a modified embodiment of the present invention as employed in a shaft to which a cotter pin is secured by means of said device;

FIGURE 5 is an enlarged fragmentary view of said device shown in FIGURE 4;

FIGURE 6 is a front elevational view of said device shown in FIGURE 4.

Referring to FIGS. 1 to 3 inclusive, there is shown a cotter pin 1 held in its operative position and the cotter pin is formed from a suitable length of hard steel wire material or rod. Since such a cotter pin 1 is not required to have any head portion or to be bent for preventing the same from inadvertently slipping out of a shaft while an operation is going on, the cotter pin may be formed to have a straight and uniform diameter throughout its length. A shaft or the like rotational member 2 is provided at one end with a through bore 3 into which the cotter pin 1 is to be inserted. In FIG. 1, the shaft 2 is shown as extending through suitable members A and B which are supported thereby and an improved washer or device 4 of the present invention is mounted on the end of the shaft 2 where the through bore 3 is provided prior to the insertion of the cotter pin 1 into the shaft bore 3. The peripheral edge of the washer 4 is bent outwardly to one side of the washer as shown in FIG. 1, at right angles or substantially right angles with respect to the center portion of the washer and the bent peripheral edge is cut inwardly at equally spaced points 5 so as to form a plurality of protruding pieces 6. One of such protruding pieces 6 is cut away from the washer edge so as to provide a space or passage 7 sufficient enough to permit the cotter pin to pass therethrough. The washer 4 is mounted onto the shaft 2 by means of its center bore 8 with the protruding pieces 6 directed outwardly, and in this case the washer 4 should be mounted onto the shaft 2 in such a manner that the pin passage 7 aligns with the pin bore 3 of the shaft 2 or after the mounting of the washer 4 on the shaft 2, for example, the washer can be then rotated a suitable angle so as to align its pin passage 7 with the shaft bore 3. Thereafter, as shown with chain lines in FIG. 3, after the cotter pin 1 has been inserted through the passage 7 until the fore end of the cotter pin comes into contact with the inner surface of the protruding piece 6 which is diametrically opposed to the passage 7, the washer 4 is then rotated until the passage 7 has been offset from the axis of the cotter pin whereby the cotter pin 1 can be effectively prevented from slipping out of the shaft bore 3. However, if the cotter pin 1 is left as it is, when the washer 4 moves around to such a degree that the axis of the cotter pin 1 aligns with the passage 7 while in operation, there is a possibility that the cotter pin may slip out, and therefore, it is necessary to firmly secure the washer 4 to the cotter pin 1. For the purpose, the protruding pieces 6b and 6c on the opposite sides of the protruding piece 6a which faces the opposing end or rear end of the cotter pin 1 are bent inwardly toward the cotter pin 1 so as to abut against on the opposite sides of the cotter pin 1 respectively, thereby to eliminate the possibility of the cotter pin slipping out of the shaft bore 3. When it is desired to remove the cotter pin 1 from the shaft 2 for any reason, the cotter pin can be easily removed therefrom if the washer 4 is rotated in any angular direction suitable to re-align its passage 7 with the bore 3 after pushing the protruding pieces 6b and 6c away from the cotter pin 1.

Therefore, the removal of the cotter pin 1 from the shaft 2 can be easily carried out by the turning of the washer 4 until the pin passage 7 re-aligns with the axis of the cotter pin 1.

Now, referring to FIGS. 4 to 6 inclusive, there is shown a modified embodiment of the present invention. The general construction of the modified washer 4' is the same as that of the washer 4 shown in FIGS. 1 to 3 except the construction of the protruding pieces on the peripheral edge and the manner in which the washer prevents the cotter pin from slipping out of the shaft inadvertently. As in the case of the washer 4 of FIGS. 1 to 3, the peripheral edge of the washer 4' is bent on one side of the center portion of the washer (outwardly in FIG. 4), but in this modified washer 4', the peripheral edge is bent at an angle somewhat inclined than right angles with respect to the center portion. However, the peripheral edge may be bent at right angles as in the case of the peripheral edge of the preceding washer 4. The bent peripheral edge is cut through along its width only at two points as indicated with numerals 5' and 5" so as to form only two protruding pieces 6' and 6", the former extending over the larger portion of the circumferential edge and the latter being narrowly defined by the cuts 5' and 5". The bent peripheral edge is further provided with a bore or pin passage 7' having a diameter sufficient enough to permit the cotter pin 1' to pass through there and one side of the bore or passage 7' is defined the smaller protruding piece 6". The smaller protruding piece 6" is formed as a bendable piece. When this modified washer or device 4' of the present invention is employed, the washer 4' is first mounted onto the shaft 2' by means of its center bore 8' with the bent peripheral edge directed outwardly in such a manner that the bore 7' of the washer 4' aligns with the pin bore 3' in the shaft or the like rotational member 2' and then the cotter pin 1' is inserted through the aligned bores 3' and 7' until the bore end of the cotter pin 1' comes to contact with the inner surface of the protruding piece 6' at a point diametrically opposed to the bore 7'. Thereafter, the smaller protruding piece 6" is bent toward the bore 7' by any suitable means whereby the bore 7' is deformed or narrowed as shown in FIG. 5 and the cotter pin 1' can be effectively prevented from slipping out of the shaft bore 3'. Thus, the cotter pin 1 will not slip out inadvertently whatever relative positions the cotter pin may assume with respect to the washer. When it is desired to pull the cotter pin 1' out of the shaft it is only necessary to bend the smaller protruding piece 6" away from the bore 7' to its original position.

While specific embodiments of the present invention have been shown and described, it will be understood that various parts thereof are capable of modification and variations without departing from the principles of the invention and that the scope of the invention should be limited only by the scope and proper interpretation of the claim appended hereto.

The invention having thus been described, what is believed to be new and desired to be protected by Letters Patent is:

A device for prevention of a cotter pin from slipping out of position comprising in combination; a cylindrical shaft, a cotter pin being of general uniform diameter throughout is entire length, and a washer, said washer having a flat annular base portion with a central opening, a circular peripheral outer edge, and a plurality of pairs of diametrically opposed, circumferentially, and equally spaced protruding pieces extending from one side of said peripheral edge at substantially 90° to said base portion, said protruding pieces forming a substantially cylindrical opening having an inner diameter substantially equal to the length of said cotter pin, and a passage for said cotter pin formed by one of said protruding pieces being removed from the edge, said washer being mounted on said shaft whereby said shaft has a transverse bore with said cotter pin being positioned in said bore, said passage being initially aligned with the bore of the shaft whereby said cotter is then inserted through the aligned pin passage and bore until the fore end of the cotter pin comes into contact with the inner surface of the protruding piece which is diametrically opposed to said passage and thereafter the washer is rotated until the longitudinal axis of the cotter is aligned with a pair of diametrically opposed protruding pieces, and the protruding pieces adjacent each side of one of the protruding pieces of said pair are radially inwardly bent so as to abut against opposite sides of said cotter pin.

References Cited by the Examiner
UNITED STATES PATENTS 1,665,100   4/1928   Klaucke _____ 85—7
1,914,590   6/1933   Worthington _____ 151—5

CARL W. TOMLIN, *Primary Examiner.*

R. S. BRITTS, *Assistant Examiner.*